(12) United States Patent
Shibano

(10) Patent No.: US 12,322,754 B2
(45) Date of Patent: Jun. 3, 2025

(54) POLYMER, ADDITIVE FOR NONAQUEOUS ELECTROLYTE SOLUTIONS, NONAQUEOUS ELECTROLYTE SOLUTION, AND LITHIUM ION SECONDARY BATTERY

(71) Applicant: NISSAN CHEMICAL CORPORATION, Tokyo (JP)

(72) Inventor: Yuki Shibano, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 728 days.

(21) Appl. No.: 17/765,670

(22) PCT Filed: Sep. 29, 2020

(86) PCT No.: PCT/JP2020/036750
§ 371 (c)(1),
(2) Date: Mar. 31, 2022

(87) PCT Pub. No.: WO2021/065844
PCT Pub. Date: Apr. 8, 2021

(65) Prior Publication Data
US 2022/0393237 A1    Dec. 8, 2022

(30) Foreign Application Priority Data
Oct. 1, 2019   (JP) .................. 2019-181410

(51) Int. Cl.
C08G 73/02   (2006.01)
H01M 4/36   (2006.01)
(Continued)

(52) U.S. Cl.
CPC ....... H01M 10/0567 (2013.01); H01M 4/366 (2013.01); H01M 4/485 (2013.01);
(Continued)

(58) Field of Classification Search
CPC .................. C08G 73/026; C08G 73/0266
See application file for complete search history.

(56) References Cited

U.S. PATENT DOCUMENTS 5,382,637 A * 1/1995 Angelopoulos ...... C08G 73/101
522/146
2008/0308771 A1* 12/2008 Lee ...................... C08G 61/124
252/500
2016/0190643 A1   6/2016 Kim et al.

FOREIGN PATENT DOCUMENTS

JP    61-183870 A    8/1986
JP     4-184870 A    7/1992
(Continued)

OTHER PUBLICATIONS

Greene, "Protective Groups in Organic Synthesis", 1999, John Wiley & Sons, 3rd Edition, pp. 1, 502, and 503 (Year: 1999).*
(Continued)

*Primary Examiner* — Nicholas A Smith
*Assistant Examiner* — Ziheng Lu
(74) *Attorney, Agent, or Firm* — Birch, Stewart, Kolasch & Birch, LLP

(57) ABSTRACT

The present invention provides a polymer which contains a repeating unit represented by formula (1).

(Continued)

(In the formula, n represents an integer of 1 or more; $R^1$ represents an optionally substituted monovalent aliphatic hydrocarbon group having from 1 to 60 carbon atoms, an optionally substituted monovalent aromatic hydrocarbon group having from 6 to 60 carbon atoms or an optionally substituted monovalent heterocyclic ring-containing group having from 2 to 60 carbon atoms; L represents a single bond, an optionally substituted divalent aliphatic hydrocarbon group having from 1 to 60 carbon atoms, an optionally substituted divalent aromatic hydrocarbon group having from 6 to 60 carbon atoms or an optionally substituted divalent heterocyclic ring-containing group having from 2 to 60 carbon atoms; and Ar represents an optionally substituted divalent aromatic hydrocarbon group having from 6 to 60 carbon atoms or an optionally substituted divalent heterocyclic ring-containing group having from 2 to 60 carbon atoms.)

13 Claims, 1 Drawing Sheet

(51) Int. Cl.
  *H01M 4/485* (2010.01)
  *H01M 4/505* (2010.01)
  *H01M 4/525* (2010.01)
  *H01M 10/0525* (2010.01)
  *H01M 10/0567* (2010.01)
  *H01M 10/44* (2006.01)
  *H01M 4/02* (2006.01)

(52) U.S. Cl.
  CPC ........... *H01M 4/505* (2013.01); *H01M 4/525* (2013.01); *H01M 10/0525* (2013.01); *H01M 10/446* (2013.01); *H01M 2004/028* (2013.01); *H01M 2220/20* (2013.01); *H01M 2300/0025* (2013.01)

(56) References Cited

FOREIGN PATENT DOCUMENTS

| | | |
|---|---|---|
| JP | 11-297355 A | 10/1999 |
| JP | 2005-116424 A | 4/2005 |
| JP | 2006-19070 A | 1/2006 |
| JP | 2016-532989 A | 9/2017 |
| KR | 10-2015-0088131 A | 7/2015 |
| WO | WO 2017/164335 A1 | 9/2017 |
| WO | WO 2019/198531 A1 | 10/2019 |

OTHER PUBLICATIONS

Alam, "Detecting CO2 Using Nanowire Chemiresistive Sensor for Monitoring Air Quality in Enclosed Space Habitat", 2014, 44th International Conference on Environmental Systems (Year: 2014).*

Extended European Search Report for European Application No. 20871684.5, dated Sep. 27, 2023.

Jaymand, "Recent progress in chemical modification of polyaniline," Progress in Polymer Science, vol. 38, 2013, pp. 1287-1306.

International Search Report (PCT/ISA/210) issued in PCT/JP2020/036750, dated Dec. 1, 2020.

Matsuura et al., "A Physicochemical Approach for the Choice of Polymeric Membrane Materials for Water Desalination by Reverse Osmosis", Desalination, vol. 38, 1981, pp. 319-337.

Written Opinion of the International Search Report (PCT/ISA/210) issued in PCT/JP2020/036750, dated Dec. 1, 2020.

* cited by examiner

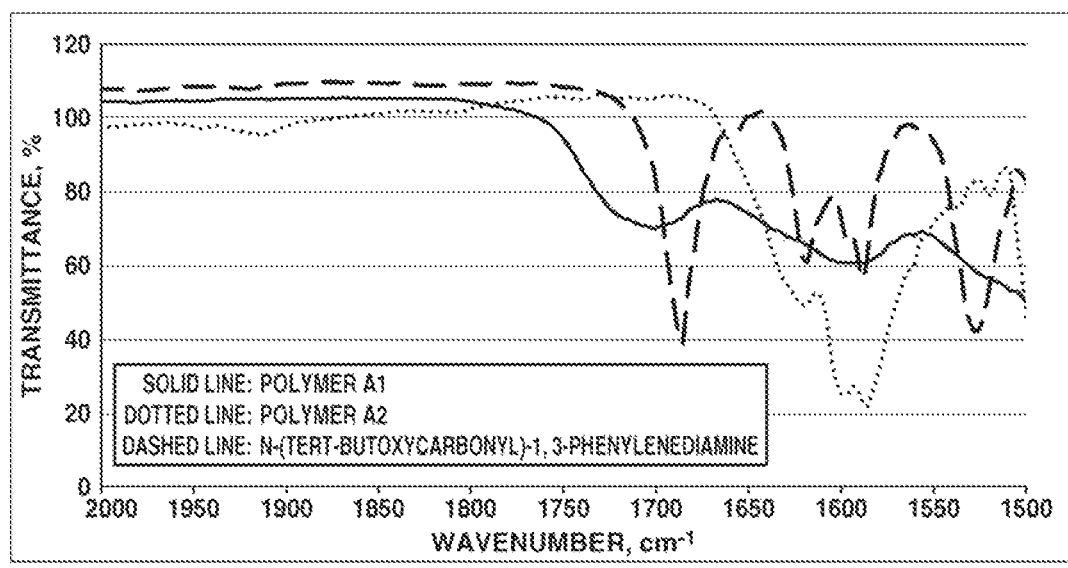

POLYMER, ADDITIVE FOR NONAQUEOUS ELECTROLYTE SOLUTIONS, NONAQUEOUS ELECTROLYTE SOLUTION, AND LITHIUM ION SECONDARY BATTERY

TECHNICAL FIELD

This invention relates to a polymer, an additive for nonaqueous electrolyte solutions, a nonaqueous electrolyte solution and a lithium-ion secondary battery.

BACKGROUND ART

With the desire in recent years for smaller sizes, lower weights and higher functionality in portable electronic devices such as smart phones, digital cameras and handheld game consoles, the development of high-performance batteries is being aggressively pursued and demand for secondary batteries, which can be repeatedly used by charging, is growing rapidly. Of these, lithium ion secondary batteries, because of their high energy density and high voltage and also because they lack a memory effect during charging and discharging, are the secondary batteries being developed most vigorously today. Also, the development of electric cars is actively proceeding as part of recent efforts to tackle environmental problems, and so a higher performance has come to be desired of the secondary batteries that serve as the power source for such vehicles.

Secondary batteries, when used as a power supply for eco-friendly vehicles such as electric cars and plug-in hybrids and also when employed in infrastructure equipment such as large-scale electrical energy storage systems, need to have both an improved performance and higher levels of reliability and safety than in the past. However, an inevitable result of increasing the energy density or output of a battery in order to enhance battery performance is that, when the battery abnormally heats up or is in a short-circuited state, thermal runaway of the battery readily arises and battery safety tends to decrease.

Lithium-ion secondary batteries have a structure in which a positive electrode and a negative electrode capable of intercalating and deintercalating lithium and a separator interposed between the electrodes are placed within a container, and the container is then filled with an electrolyte solution (in the case of lithium-ion polymer secondary batteries, a gel-like or completely solid electrolyte is used instead of a liquid electrolyte solution). A lithium composite oxide such as $LiCoO_2$ is used as the positive electrode active material, and a carbon material such as graphite is used as the negative electrode act[ive material. Such lithium-ion secondary batteries are generally used at a working voltage of 2.5 to 4.2 V.

As mentioned above, the range of application for lithium-ion secondary batteries continues to expand and investigations are being carried out that use such batteries in which the ratio of elemental nickel in the positive electrode active material has been made higher and the capacity per unit weight has been increased in order to further enhance performance. However, when the ratio of elemental nickel in the positive electrode active material is made higher, the temperature up to thermal runoff of the positive electrode active material in the charged state decreases and there is a tendency for the amount of heat generated to rise. As a result, in an abnormal state such as during internal shorting of the battery, thermal runaway of the battery readily occurs, dramatically lowering battery safety.

Various efforts are being made to improve the safety of lithium-ion secondary batteries to short-circuiting. Attempts to improve battery safety include, for example, in Patent Documents 1 and 2, the addition of a phosphorus-based material to the electrolyte solution, and in Patent Documents 3 and 4, the addition of an ionic liquid to the electrolyte solution, thereby fire-retarding the electrolyte solution. However, with these materials alone, the ionic conductivity is low and battery performance decreases. Hence, such materials must be used in combination with the carbonate solvents typically used as the primary solvent in lithium ion secondary batteries. Because these carbonate solvents are flammable, a large amount of phosphorus-based material or ionic liquid must be added, as a result of which the battery performance worsens and costs are higher than when a carbonate solvent is used alone.

In order to overcome such drawbacks with prior-art organic electrolytes and additives, active efforts are being made to modify the electrode materials and develop new electrolytes that contain additives.

PRIOR ART DOCUMENTS

Patent Documents

Patent Document 1: JP-A H04-184870
Patent Document 2: JP-A 2005-116424
Patent Document 3: JP-A H11-297355
Patent Document 4: JP-A 2006-19070

SUMMARY OF INVENTION

Technical Problem

The present invention was arrived at in light of the above circumstances. An object of the invention is to provide a polymer, an additive for nonaqueous electrolyte solutions, a nonaqueous electrolyte solution, and a lithium-ion secondary battery using the same which enable lithium-ion secondary batteries of improved safety at the time of a short-circuit to be manufactured.

Solution to Problem

The inventors have conducted intensive investigations in order to achieve the above objects. As a result, they have discovered that by using a nonaqueous electrolyte solution which includes as an additive a polymer of a specific structure, even in cases where a positive electrode active material having a high ratio of elemental nickel is used, the safety of the lithium-ion battery at the time of a short-circuit is enhanced. This discovery ultimately led to the present invention.

Accordingly, the invention provides the following polymer, additive for nonaqueous electrolyte solutions, nonaqueous electrolyte solution and lithium ion secondary battery.

1. A polymer containing repeating units of formula (1) below

[Chem. 1]

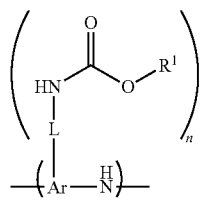
(1)

(wherein n is an integer of 1 or more;

$R^1$ is a monovalent aliphatic hydrocarbon group of 1 to 60 carbon atoms that may be substituted with $Z^1$, a monovalent aromatic hydrocarbon group of 6 to 60 carbon atoms that may be substituted with $Z^2$ or a monovalent heterocycle-containing group of 2 to 60 carbon atoms that may be substituted with $Z^2$;

L is a single bond, a divalent aliphatic hydrocarbon group of 1 to 60 carbon atoms that may be substituted with $Z^1$, a divalent aromatic hydrocarbon group of 6 to 60 carbon atoms that may be substituted with $Z^2$ or a divalent heterocycle-containing group of 2 to 60 carbon atoms that may be substituted with $Z^2$;

Ar is a (2+n)-valent aromatic hydrocarbon group of 6 to 60 carbon atoms that may be substituted with $Z^2$ or a (2+n)-valent heterocycle-containing group of 2 to 60 carbon atoms that may be substituted with $Z^2$;

$Z^1$ is a halogen atom, an amino group, a hydroxyl group, a nitro group, a cyano group, an oxo group, a carboxyl group, a sulfo group, a phosphate group, a thiol group, a silyl group, a monovalent aromatic hydrocarbon group of 6 to 60 carbon atoms that may be substituted with $Z^3$ or a monovalent heterocycle-containing group of 2 to 60 carbon atoms that may be substituted with $Z^3$;

$Z^2$ is a halogen atom, an amino group, a hydroxyl group, a nitro group, a cyano group, an oxo group, a carboxyl group, a sulfo group, a phosphate group, a thiol group, a silyl group or a monovalent aliphatic hydrocarbon group of 1 to 60 carbon atoms that may be substituted with $Z^3$; and $Z^3$ is a halogen atom, an amino group, a hydroxyl group, a nitro group, a cyano group, an oxo group, a carboxyl group, a sulfo group, a phosphate group, a silyl group or a thiol group).

2. The polymer of 1 above, wherein Ar is a group obtained by removing n hydrogen atoms from the aromatic ring of a phenylene group that may be substituted with $Z^2$.
3. The polymer of 1 or 2 above, wherein L is a single bond.
4. The polymer of any of 1 to 3 above, wherein $R^1$ is a group such that $R^1$—O—C(O)— serves as an amino protecting group.
5. An additive for nonaqueous electrolyte solutions which includes the polymer of any of 1 to 4 above.
6. A nonaqueous electrolyte solution which includes the additive of 5 above.
7. The nonaqueous solution of 6 above, wherein the content of the additive is from 0.01 to 10 wt %.
8. The nonaqueous solution of 7 above, wherein the content of the additive is from 0.1 to 1 wt %.
9. A lithium-ion secondary battery comprising the nonaqueous electrolyte solution of any of 6 to 8 above, and a positive electrode and negative electrolyte capable of intercalating and deintercalating lithium.
10. The lithium-ion secondary battery of 9 above which is adapted for use by charging in a range of 4.0 to 5.0 V.
11. The lithium-ion secondary battery of 9 or 10 above, wherein the positive electrode comprises a positive electrode active material which is a layered lithium composite oxide.
12. The lithium-ion secondary battery of 11 above, wherein the layered lithium composite oxide is a compound of formula (6) below $$Li(Ni_aCo_bMn_c)O_2 \qquad (6)$$

(wherein a, b and c being numbers that satisfy the conditions $0 \le a \le 1$, $0 \le b \le 1$, $0 \le c \le 1$ and $a+b+c=1$).

13. The lithium-ion secondary battery of 11 above, wherein the layered lithium composite oxide is a compound of formula (7) below $$Li(Ni_dCO_eAl_f)O_2 \qquad (7)$$

(wherein d, e and f being numbers that satisfy the conditions $0 \le d<1$, $0 \le e<1$, $0<f<1$ and $d+e+f=1$).

Advantageous Effects of Invention

In lithium-ion secondary batteries that use the polymer additive of the invention, even in cases where a positive electrode active material having a high ratio of elemental nickel is used, the safety to short-circuiting is enhanced by the use of a nonaqueous electrolyte solution containing an additive having a specific structure. It is thus possible, with lithium-ion secondary batteries that use the additive of the invention, to achieve high-safety power supplies for eco-friendly vehicles such as electric cars and plug-in hybrids and also infrastructure equipment such as large-scale electrical energy storage systems.

BRIEF DESCRIPTION OF DRAWINGS

FIG. 1 presents the infrared absorption spectra for the P-Boc-mPDA synthesized in Example 1, the P-mPDA synthesized in Comparative Example 1 and N-(tert-butoxycarbonyl)-1,3-phenylenediamine.

DESCRIPTION OF EMBODIMENTS

[Polymer]

The polymer of the invention contains repeating units of formula (1) below.

[Chem. 2]

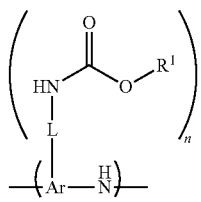
(1)

In formula (1), n is an integer of 1 or more, and is preferably from 1 to 4, and more preferably 1 or 2.

In formula (1), $R^1$ is a monovalent aliphatic hydrocarbon group of 1 to 60 carbon atoms that may be substituted with $Z^1$, a monovalent aromatic hydrocarbon group of 6 to 60 carbon atoms that may be substituted with $Z^2$ or a monovalent heterocycle-containing group of 2 to 60 carbon atoms that may be substituted with $Z^2$. When n is 2 or more, each L and each $R^1$ may be the same or may be different.

$Z^1$ is a halogen atom, an amino group, a hydroxyl group, a nitro group, a cyano group, an oxo group, a carboxyl group, a sulfo group, a phosphate group, a thiol group, a silyl group, a monovalent aromatic hydrocarbon group of 6 to 60 carbon atoms that may be substituted with $Z^3$ or a monovalent heterocycle-containing group of 2 to 60 carbon atoms that may be substituted with $Z^3$. $Z^2$ is a halogen atom, an amino group, a hydroxyl group, a nitro group, a cyano group, an oxo group, a carboxyl group, a sulfo group, a phosphate group, a thiol group, a silyl group or a monovalent aliphatic hydrocarbon group of 1 to 60 carbon atoms which may be substituted with $Z^3$. $Z^3$ is a halogen atom, an amino group, a hydroxyl group, a nitro group, a cyano group, an oxo group, a carboxyl group, a sulfo group, a phosphate group, a silyl group or a thiol group.

The monovalent aliphatic hydrocarbon group is a group obtained by removing one hydrogen atom from an aliphatic hydrocarbon, and may be a saturated hydrocarbon group or an unsaturated hydrocarbon group. These groups may be linear, branched or cyclic.

Examples of the monovalent saturated hydrocarbon groups include alkyl groups such as methyl, ethyl, n-propyl, isopropyl, n-butyl, isobutyl, sec-butyl, tert-butyl, n-pentyl, n-hexyl, n-heptyl, n-octyl, n-nonyl and n-decyl groups; and monovalent cyclic saturated hydrocarbon groups such as cyclopropyl, cyclobutyl, cyclopentyl, cyclohexyl, cycloheptyl, cyclooctyl, cyclononyl, cyclodecyl, bicyclobutyl, bicyclopentyl, bicyclohexyl, bicycloheptyl, bicyclooctyl, bicyclononyl and bicyclodecyl groups.

Examples of the monovalent unsaturated aliphatic hydrocarbon groups include alkenyl groups such as vinyl, 1-propenyl, 2-propenyl, 1-methylvinyl, 1-butenyl, 2-butenyl, 3-butenyl, 2-methyl-1-propenyl, 2-methyl-2-propenyl, 1-ethylvinyl, 1-methyl-1-propenyl, 1-methyl-2-propenyl, 1-pentenyl, 1-decenyl and 1-eicosenyl groups; alkynyl groups such as ethynyl, 1-propynyl, 2-propynyl, n-1-butynyl, 2-butynyl, 3-butynyl, 1-methyl-2-propynyl, 1-pentynyl, 2-pentynyl, 3-pentynyl, 4-pentynyl, 1-methyl-3-butynyl, 2-methyl-3-butynyl, 3-methyl-1-butynyl, 1,1-dimethyl-2-propynyl, 1-hexynyl, 1-decynyl, 1-pentadecynyl and 1-eicosynyl groups; and monovalent cyclic unsaturated aliphatic hydrocarbon groups such as the 1-cyclohexenyl group.

The monovalent aromatic hydrocarbon group is a group obtained by removing one hydrogen atom from an aromatic hydrocarbon, and is exemplified by aryl groups and aralkyl groups.

Examples of the aryl groups include phenyl, methylphenyl, ethylphenyl, n-propylphenyl, isopropylphenyl, dimethylphenyl, biphenylyl, naphthyl, anthryl and phenanthryl groups.

Examples of the aralkyl groups include benzyl, methylphenylmethyl, ethylphenylmethyl, n-propylphenylmethyl, isopropylphenylmethyl, butylphenylmethyl, isobutylphenylmethyl, phenylethyl, naphthylmethyl and phenylcyclohexyl groups.

The monovalent heterocycle-containing group is a group obtained by removing one hydrogen atom from a heterocyclic compound. Examples of the monovalent heterocycle-containing group include 2-thienyl, 3-thienyl, 2-furanyl, 3-furanyl, 2-oxazolyl, 4-oxazolyl, 5-oxazolyl, 3-isooxazolyl, 4-isooxazolyl, 5-isooxazolyl, 2-thiazolyl, 4-thiazolyl, 5-thiazolyl, 3-isothiazolyl, 4-isothiazolyl, 5-isothiazolyl, 2-imidazolyl, 4-imidazolyl, 2-pyridyl, 3-pyridyl and 4-pyridyl groups.

$R^1$ is preferably an alkyl group of 1 to 12 carbon atoms that may be substituted with $Z^1$, a monovalent cyclic saturated hydrocarbon group of 3 to 12 carbon atoms that may be substituted with $Z^1$, an alkenyl group of 2 to 12 carbon atoms that may be substituted with $Z^1$, an alkynyl group of 2 to 12 carbon atoms that may be substituted with $Z^1$, an aralkyl group of 7 to 20 carbon atoms that may be substituted with $Z^2$ or a monovalent cyclic unsaturated aliphatic hydrocarbon group of 3 to 12 carbon atoms. In particular, $R^1$ is preferably a group such that $R^1$—O—C(O)— serves as an amino protecting group. More preferred examples of $R^1$ include tert-butyl, allyl, benzyl, methyl, 2,2,2-trichloroethyl, fluorenylmethyl, fluorenylethyl and 2-trimethylsilylethyl groups; the tert-butyl group is most preferred.

In formula (1), L is a single bond, a divalent aliphatic hydrocarbon group of 1 to 60 carbon atoms that may be substituted with $Z^1$, a divalent aromatic hydrocarbon group of 6 to 60 carbon atoms that may be substituted with $Z^2$ or a divalent heterocycle-containing group of 2 to 60 carbon atoms that may be substituted with $Z^2$. Ar is a (2+n)-valent aromatic hydrocarbon group of 6 to 60 carbon atoms that may be substituted with $Z^2$ or a (2+n)-valent heterocycle-containing group of 2 to 60 carbon atoms that may be substituted with $Z^2$.

The divalent aromatic hydrocarbon group represented by L is a group obtained by removing one additional hydrogen atom from the above-described monovalent aromatic hydrocarbon group. Specific examples include phenylene, methylphenylene, ethylphenylene, n-propylphenylene, isopropylphenylene, naphthalenediyl, diphenyldiyl and terphenyldiyl groups. The (2+n)-valent aromatic hydrocarbon group represented by Ar is a group obtained by removing n additional hydrogen atoms from the above divalent aromatic hydrocarbon group.

The divalent heterocycle-containing group represented by L is a group obtained by removing one additional hydrogen atom from the above-described monovalent heterocycle-containing group. Specific examples include thiophenediyl, furandiyl, oxazolinediyl, isooxazolinediyl, thiazolediyl, isothiazolediyl, imidazolediyl and pyridinediyl groups. The (2+n)-valent heterocycle-containing group represented by Ar is exemplified by groups obtained by removing n additional hydrogen atoms from the above-described divalent heterocycle-containing group.

Of these, L is preferably a single bond, a divalent aliphatic hydrocarbon group of 1 to 20 carbon atoms that may be substituted with $Z^1$, a divalent aromatic hydrocarbon group of 6 to 20 carbon atoms that may be substituted with $Z^2$ or a divalent heterocycle-containing group of 2 to 20 carbon atoms that may be substituted with $Z^2$; more preferably a single bond or a divalent aliphatic hydrocarbon group of 1 to 6 carbon atoms that may be substituted with $Z^1$; and even more preferably a single bond.

Also, Ar is preferably a (2+n)-valent aromatic hydrocarbon group of 6 to 20 carbon atoms that may be substituted with $Z^2$ or a (2+n)-valent heterocycle-containing group of 2 to 20 carbon atoms that may be substituted with $Z^2$, more preferably a group obtained by removing n hydrogen atoms from the aromatic ring of a phenylene group that may be substituted with $Z^2$, and even more preferably a group obtained by removing n hydrogen atoms from a phenylene group.

The monomer that provides the repeating units of formula (1) is preferably one of any of formulas (2) to (4) below.

[Chem. 3]

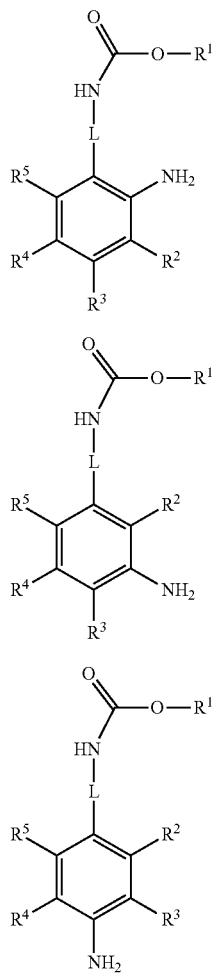

(2)

(3)

(4)

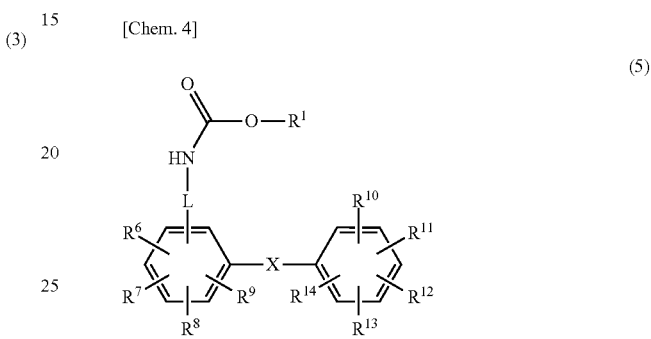

(5)

In formulas (2) to (4), $R^2$ to $R^5$ are each independently a hydrogen atom, a monovalent aliphatic hydrocarbon group of 1 to 60 carbon atoms that may be substituted with $Z^1$, a monovalent aromatic hydrocarbon group of 6 to 60 carbon atoms that may be substituted with $Z^2$, a monovalent heterocycle-containing group of 2 to 60 carbon atoms that may be substituted with $Z^2$, a halogen atom, a hydroxyl group, a nitro group, a cyano group, a borate group, a sulfonic group, a phosphate group, a silyl group, a thiol group, —O—$R^A$, —O—C(=O)—$R^B$ or —C(=O)—O—$R^C$ ($R^A$, $R^B$ and $R^C$ being each independently a monovalent aliphatic hydrocarbon group of 1 to 60 carbon atoms that may be substituted with $Z^1$, a monovalent aromatic hydrocarbon group of 6 to 60 carbon atoms that may be substituted with $Z^2$ or a monovalent heterocycle-containing group of 2 to 60 carbon atoms that may be substituted with $Z^2$), with any one of $R^2$ to $R^5$ being a hydrogen atom. R', L, $Z^1$ and $Z^2$ are as defined above.

The aforementioned monovalent aliphatic hydrocarbon group, aromatic hydrocarbon group and heterocycle-containing group are exemplified in the same way as described above.

$R^2$ to $R^5$ are each preferably a hydrogen atom, an alkyl group of 1 to 20 carbon atoms, an alkenyl group of 2 to 20 carbon atoms, an alkynyl group of 2 to 20 carbon atoms, an aralkyl group of 7 to 20 carbon atoms, —O—$R^A$, —O—C(=O)—$R^B$ or —C(=O)—O—$R^C$; more preferably a hydrogen atom, an alkyl group of 1 to 12 carbon atoms, an aralkyl group of 7 to 12 carbon atoms, an alkoxy group of 1 to 12 carbon atoms, an alkyloxycarbonyl group of 2 to 12 carbon atoms or an alkylcarbonyloxy group of 7 to 12 carbon atoms; even more preferably a hydrogen atom or an alkyl group of 1 to 4 carbon atoms; and most preferably a hydrogen atom. It is especially preferably for all of $R^2$ to $R^5$ to be hydrogen atoms.

The monomer that provides the repeating units of formula (1) is preferably one of formula (5) below.

[Chem. 4]

In formula (5), $R^6$ to $R^{14}$ are each independently a hydrogen atom, an amino group, a monovalent aliphatic hydrocarbon group of 1 to 60 carbon atoms that may be substituted with $Z^1$, a monovalent aromatic hydrocarbon group of 6 to 60 carbon atoms that may be substituted with $Z^2$, a monovalent heterocycle-containing group of 2 to 60 carbon atoms that may be substituted with $Z^2$, a halogen atom, a hydroxyl group, a nitro group, a cyano group, a borate group, a sulfonic group, a phosphate group, a silyl group, a thiol group, —O—$R^A$, —O—C(=O)—$R^B$ or —C(=O)—O—$R^C$, with any one of $R^6$ to $R^{14}$ being an amino group and any one of $R^6$ to $R^{14}$ being a hydrogen atom. $R^1$, $R^A$, $R^B$, $R^C$, $Z^1$ and $Z^2$ are as defined above.

In formula (5), X is a single bond, an ester bond, an amide bond, a urethane bond, a urea bond, an ether bond, a thioether bond, —N($R^D$)— (wherein $R^D$ is a hydrogen atom, a monovalent aliphatic hydrocarbon group of 1 to 60 carbon atoms or a monovalent aromatic hydrocarbon group of 6 to 60 carbon atoms), a carbonate group, a carbonyl group, a sulfonyl group, a divalent aliphatic hydrocarbon group of 1 to 60 carbon atoms that may be substituted with $Z^1$, a divalent aromatic hydrocarbon group of 6 to 60 carbon atoms that may be substituted with $Z^2$ or a divalent heterocycle-containing group of 2 to 60 carbon atoms that may be substituted with $Z^2$.

The divalent aliphatic hydrocarbon group is a group obtained by removing one additional hydrogen atom from the above-described monovalent aliphatic hydrocarbon group. Specific examples include alkanediyl groups such as methylene, ethane-1,1-diyl, ethane-1,2-diyl, propane-1,2-diyl, propane-1,3-diyl, butane-1,4-diyl, pentane-1,5-diyl and hexane-1,6-diyl groups; cycloalkanediyl groups such as cyclohexane-1,1-diyl, cyclohexane-1,2-diyl and cyclohexane-1,4-diyl groups; alkenediyl groups such as ethene-1,1-diyl, ethene-1,2-diyl and 2-butene-1,4-diyl groups; and alkynediyl groups such as the ethyne-1,2-diyl group. The divalent aromatic hydrocarbon groups and divalent heterocycle-containing groups are exemplified in the same way as above.

Of $R^6$ to $R^{14}$, those groups which are not amino groups are preferably a hydrogen atom, an alkyl group of 1 to 20 carbon atoms, an alkenyl group of 2 to 20 carbon atoms, an alkynyl group of 2 to 20 carbon atoms, an aralkyl group of 2 to 20 carbon atoms, —O—$R^A$, —O—C(=O)—$R^B$ or —C(=O)—O—$R^C$; more preferably a hydrogen atom, an alkyl group of 1 to 12 carbon atoms, an aralkyl group of 2 to 12 carbon atoms, an alkoxy group of 1 to 12 carbon atoms, an alkyloxycarbonyl group of 2 to 12 carbon atoms or an alkylcarbonyloxy group of 2 to 12 carbon atoms; even more preferably a hydrogen atom or an alkyl group of 1 to 4 carbon atoms; and most preferably a hydrogen atom. In particular, in cases where one of $R^6$ to $R^9$ is an amino group, it is preferable for another of $R^6$ to $R^9$ to be a hydrogen atom; in cases where one of $R^{10}$ to $R^{13}$ is an amino group, it is preferable for another of $R^{10}$ to $R^{13}$ to be a hydrogen atom; and it is especially preferable for all groups other than the amino groups to be hydrogen atoms.

X is preferably a single bond, an ester bond, an amide bond, a urethane bond, a urea bond, an ether bond, a thioether bond, —N($R^E$)— (wherein $R^E$ is a hydrogen atom, a monovalent aliphatic hydrocarbon group of 1 to 6 carbon atoms or a monovalent aromatic hydrocarbon group of 6 to 12 carbon atoms), a carbonate group, a carbonyl group, a sulfonyl group, a divalent aliphatic hydrocarbon group of 1 to 6 carbon atoms that may be substituted with $Z^1$, a divalent aromatic hydrocarbon group of 6 to 12 carbon atoms that may be substituted with $Z^2$ or a divalent heterocycle-containing group of 2 to 12 carbon atoms that may be substituted with $Z^2$; more preferably a single bond, an ester bond, an amide bond, a urethane bond, a urea bond, an ether bond, a thioether bond, —N($R^F$)— (wherein $R^F$ is a hydrogen atom or a monovalent aliphatic hydrocarbon group of 1 to 6 carbon atoms), a carbonate group, a carbonyl group or a sulfonyl group; even more preferably a single bond, an ether bond, a thioether bond or —NH—; and most preferably a single bond.

The polymer has a weight-average molecular weight (Mw) of preferably from 1,000 to 1,000,000, and more preferably from 1,000 to 100,000. In this invention, the weight-average molecular weight is a polystyrene-equivalent measured value obtained by gel permeation chromatography (GPC).

[Additive for Nonaqueous Electrolyte Solutions]

The polymer can be suitably used as an additive for nonaqueous electrolyte solutions.

[Nonaqueous Electrolyte Solution]

The nonaqueous electrolyte solution of the invention includes an electrolyte, a nonaqueous organic solvent and an additive composed of the above polymer.

The electrolyte used here may be a hitherto known electrolyte for lithium-ion secondary batteries. Specific examples include lithium salts such as lithium tetrafluoroborate, lithium hexafluorophosphate, lithium perchlorate and lithium trifluoromethanesulfonate; quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate; lithium imides such as lithium bis(trifluoromethanesulfonyl)imide and lithium bis(fluorosulfonyl)imide; and lithium borates such as lithium bis(oxalato)borate. The electrolyte content in this nonaqueous electrolyte solution is preferably from 0.01 to 5 mol/L, and more preferably from 0.1 to 3 mol/L.

The nonaqueous organic solvent used here may be a hitherto known nonaqueous organic solvent for lithium-ion secondary batteries. Specific examples include alkylene carbonates such as propylene carbonate, ethylene carbonate and butylene carbonate; dialkyl carbonates such as dimethyl carbonate, methyl ethyl carbonate and diethyl carbonate; nitriles such as acetonitrile; and amides such as dimethylformamide. The solvent may be of one type used alone, or two or more may be used in admixture.

The content of the additive in the nonaqueous electrolyte solution is preferably from 0.01 to 10 wt %, and more preferably from 0.1 to 1 wt %. At a content of the additive in this range, a nonaqueous electrolyte solution can be obtained that improves safety without worsening the battery characteristics. The additive may be of one type used alone, or two or more may be used in admixture.

The nonaqueous electrolyte solution may additionally include a hitherto known additive for lithium-ion secondary batteries (also referred to below as the "other additive"). Examples of such other additives include carbonates such as vinylene carbonate, vinyl ethylene carbonate and fluoroethylene carbonate; sulfur-containing compounds such as 1-propen-1,3-sultone; phosphate esters such as trimethyl phosphate and triethyl phosphate; phosphite esters such as trimethyl phosphite and triethyl phosphite; cyclic phosphazene compounds such as monoethoxy(pentafluoro)cyclotriphosphazene; and aromatic compounds such as cyclohexylbenzene and biphenyl. The content of the other additive is not particularly limited so long as the advantageous effects of the invention are not diminished. The other additive may be of one type used alone, or two or more may be used in combination.

[Lithium-Ion Secondary Battery]

The lithium-ion secondary battery of the invention is furnished with the above nonaqueous electrolyte solution, and also has a positive electrode and a negative electrode which are capable of intercalating and deintercalating lithium.

[Positive Electrode and Negative Electrode]

The positive electrode and the negative electrode (collectively referred to below as "the electrodes") each have an electrode mixture layer provided on top of a current collector. An undercoat layer may be optionally formed between the current collector and the electrode mixture layer in order to increase adhesion therebetween or lower resistance at the contact interface.

Hitherto known current collectors for lithium-ion secondary batteries may be used as the current collector. Specific examples include thin films of copper, aluminum, titanium, stainless steel, nickel, gold, silver and alloys of these metals, as well as carbon materials, metal oxides and electrically conductive polymers. The thickness of the current collector, although not particularly limited, is preferably from 1 to 100 μm in this invention.

The electrode mixture layer can be formed by applying an electrode slurry containing an active material, a binder polymer and, optionally, a solvent onto the current collector (or, when an undercoat layer is formed, onto the undercoat layer), and air drying or drying the applied slurry under applied heat.

Various active materials that are used in lithium-ion secondary batteries may be used as the active material. For example, chalcogen compounds capable of intercalating and deintercalating lithium ions, lithium ion-containing chalcogen compounds, polyanionic compounds, elemental sulfur and sulfur compounds may be used as the positive electrode active material.

Examples of such chalcogen compounds that are capable of intercalating and deintercalating lithium ions include $FeS_2$, $TiS_2$, $MoS_2$, $V_2O_6$, $V_6O_{13}$ and $MnO_2$.

Examples of lithium-containing chalcogen compounds include compounds of the formula $Li_xNi_yM_{1-y}O_2$ (wherein M is one or more metallic element selected from the group consisting of cobalt, manganese, titanium, chromium, vanadium, aluminum, tin, lead and zinc; $0.05 \le x \le 1.10$ and $0.5 \le y \le 1.0$). Examples of such compounds include $LiCoO_2$, $LiMnO_2$, $LiMn_2O_4$, $LiMo_2O_4$, $LiV_3O_8$ and $LiNiO_2$.

An example of a polyanionic compound is lithium iron phosphate ($LiFePO_4$). Examples of sulfur compounds include $Li_2S$ and rubeanic acid.

Of these, the positive electrode active material is preferably a lithium ion-containing chalcogen compound, especially a layered lithium composite oxide. The layered lithium composite oxide is preferably a compound of formula (6) below.

$$Li(Ni_aCo_bMn_c)O_2 \quad (6)$$

(wherein a, b and c are numbers satisfying the conditions $0 \le a \le 1$, $0 \le b \le 1$, $0 \le c \le 1$ and $a+b+c=1$).

Preferred examples of the compound of formula (6) include $LiCoO_2$, $LiMnO_2$, $LiNiO_2$, compounds for which $a=\frac{1}{3}$, $b=\frac{1}{3}$ and $c=\frac{1}{3}$ in formula (6), compounds for which $a=0.5$, $b=0.2$ and $c=0.3$ in formula (6), compounds for which $a=0.6$, $b=0.2$ and $c=0.2$ in formula (6) and compounds for which $a=0.8$, $b=0.1$ and $c=0.1$ in formula (6). The compound of formula (6) is more preferably $LiCoO_2$.

Compounds of formula (7) below are also preferred as the layered lithium composite oxide.

$$Li(Ni_dCo_eMn_f)O_2 \quad (7)$$

(wherein d, e and f are numbers satisfying the conditions $0 \le d < 1$, $0 \le e < 1$, $0 < f < 1$ and $d+e+f=1$).

The compound of formula (7) is preferably a layered lithium composite oxide which satisfies the conditions $0.8 \le d < 1$, $0 \le e < 0.2$, $0 < f \le 0.2$ and $d+e+f=1$, and is more preferably a layered lithium composite oxide which satisfies the conditions $0.8 \, d \, 0.92$, $0.05 \le e \le 0.17$, $0.03 \le f \le 0.15$ and $d+e+f=1$.

The following may be used as the active material in the negative electrode: alkali metals, alkali metal alloys, at least one elemental substance selected from among Group 4 to 15 elements of the periodic table which intercalate and deintercalate lithium ions, as well as oxides, sulfides and nitrides thereof, and carbon materials which are capable of reversibly intercalating and deintercalating lithium ions.

Illustrative examples of the alkali metals include lithium, sodium and potassium. Illustrative examples of the alkali metal alloys include Li—Al, Li—Mg, Li—Al—Ni, Na—Hg and Na—Zn.

Illustrative examples of the at least one elemental substance selected from among Group 4 to 15 elements of the periodic table which intercalate and deintercalate lithium ions include silicon, tin, aluminum, zinc and arsenic.

Illustrative examples of the oxides include tin silicon oxide ($SnSiO_3$), lithium bismuth oxide ($Li_3BiO_4$), lithium zinc oxide ($Li_2ZnO_2$), lithium titanium oxide ($Li_4TiSO_{12}$) and titanium oxide.

Illustrative examples of the sulfides include lithium iron sulfides ($Li_xFeS_2$ ($0 \le x \le 3$)) and lithium copper sulfides ($Li_xCuS$ ($0 \le x \le 3$)).

Exemplary nitrides include lithium-containing transition metal nitrides, illustrative examples of which include $Li_xM_yN$ (wherein M is cobalt, nickel or copper, $0 \le x \le 3$ and $0 \le y \le 0.5$) and lithium iron nitride ($Li_3FeN_4$).

Examples of carbon materials which are capable of reversibly intercalating and deintercalating lithium ions include graphite, carbon black, coke, glassy carbon, carbon fibers, carbon nanotubes, and sintered compacts of these.

A known material may be suitably selected and used as the binder polymer. Illustrative examples include polyvinylidene fluoride (PVDF), polyvinylpyrrolidone, polytetrafluoroethylene, tetrafluoroethylene-hexafluoropropylene copolymers, vinylidene fluoride-hexafluoropropylene copolymers (P(VDF-HFP)), vinylidene fluoride-chlorotrifluoroethylene copolymers (P(VDF-CTFE)), polyvinyl alcohol, polyimides, ethylene-propylene-diene ternary copolymers, styrene-butadiene rubbers, CMC, polyacrylic acid (PAA), and electrically conductive polymers such as polyanilines. These binder polymers may be of one type used alone, or two or more types may be used in combination.

The binder polymer is added in an amount per 100 parts by weight of the active material that is preferably from 0.1 to 20 parts by weight, and especially from 1 to 10 parts by weight.

A known solvent may be used as the solvent. Examples of suitable solvents include water and the following organic solvents: ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol, n-propanol and butanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. One of these solvents may be used alone, or two or more may be used in admixture.

The solvent may be suitably selected from these solvents according to the type of binder. In the case of a nonaqueous binder such as PVDF, NMP is preferred; in the case of a water-soluble binder such as PAA, water is preferred.

The electrode slurry may include a conductive agent. Illustrative examples of the conductive agent include carbon black, ketjen black, acetylene black, carbon whiskers, carbon nanotubes, carbon fibers, natural graphite, synthetic graphite, titanium oxide, ruthenium oxide, aluminum and nickel.

Examples of electrode slurry coating methods include spin coating, dip coating, flow coating, inkjet coating, spray coating, bar coating, gravure coating, slit coating, roll coating, flexographic printing, transfer printing, brush coating, blade coating and air knife coating. Of these, from the standpoint of the efficiency of the coating operation and other considerations, dip coating, bar coating, blade coating, slit coating, roll coating, gravure coating and flexographic printing are preferred.

The temperature when drying the applied electrode slurry under applied heat, although not particularly limited, is preferably from about 50° C. to about 400° C., and more preferably from about 80° C. to about 150° C.

A known undercoat layer for electrodes may be used as the undercoat layer. For example, use can be made of that described in WO 2016/194747 A1.

The region where the electrode mixture layer is formed should be suitably set according to such considerations as the cell configuration of the lithium-ion secondary battery to be used and may be either the entire surface of the current collector (or undercoat layer) or a portion thereof. For example, for use in a laminate cell as an electrode assembly in which the metal tabs and the electrodes are bonded together by welding such as ultrasonic welding, it is preferable to form the electrode mixture layer by applying the electrode slurry to part of the current collector (or undercoat layer) surface in order to leave a welding region. In laminate cell applications in particular, it is preferable to form the electrode mixture layer by applying the electrode slurry to an area of the current collector (or undercoat layer) other than the periphery thereof.

The electrode mixture layer has a thickness which, taking into account the balance between battery capacity and resistance, is preferably from 10 to 500 µm, more preferably from 10 to 300 µm, and even more preferably from 20 to 100 µm.

If necessary, the electrode may be pressed. A commonly employed method may be used as the pressing method, although a die pressing method or a roll pressing method is especially preferred. The pressing force in the roll pressing method, although not particularly limited, is preferably from 0.2 to 3 metric tons/cm.

So long as the lithium-ion secondary battery of the invention includes the above-described positive and negative electrodes and the above-described nonaqueous electrolyte solution, the battery may also use, as other constituent members therein, hitherto known battery components. For instance, examples of separators that may be used include cellulose separators and polyolefin separators.

The configuration of the lithium-ion secondary battery of the invention is not particularly limited. Cells of various known configurations, such as cylindrical cells, flat wound prismatic cells, stacked prismatic cells, coin cells, flat wound laminate cells and stacked laminate cells, may be used.

When used in a coil cell, the above-described electrode may be die-cut in a specific disk shape and used. For example, a lithium-ion secondary battery can be fabricated by setting a given number of layers of lithium foil die-cut to a given shape on a coin cell cap to which a washer and a spacer have been welded, laying an electrolyte solution-impregnated separator of the same shape on top thereof, laying the electrode on top of the separator with the electrode mixture layer facing down, placing the coin cell case and a gasket thereon and sealing the cell with a coin cell crimper.

In a stacked laminate cell, use may be made of an electrode assembly obtained by welding a metal tab to a region of the electrode where the electrode mixture layer has not been formed (welding region). In this case, the electrodes making up the electrode assembly may each be composed of a single plate or a plurality of plates, although a plurality of plates are generally used in both the positive and negative electrodes. The plurality of electrode plates used to form the positive electrode are preferably stacked in alternation one plate at a time with the plurality of electrode plates used to form the negative electrode. At this time, it is preferable to interpose the above-described separator between the positive electrode plates and the negative electrode plates.

A metal tab may be welded at a welding region on the outermost electrode plate of the plurality of electrode plates, or a metal tab may be sandwiched and welded between the welding regions on any two adjoining electrode plates of the plurality of electrode plates. The metal tab material is not particularly limited, provided it is one that is commonly used in lithium-ion secondary batteries. Examples include metals such as nickel, aluminum, titanium and copper; and alloys such as stainless steel, nickel alloys, aluminum alloys, titanium alloys and copper alloys. Of these, from the standpoint of the welding efficiency, it is preferable for the tab material to include at least one metal selected from aluminum, copper and nickel. The metal tab is preferably in the form of a foil and has a thickness that is preferably from about 0.05 mm to about 1 mm.

Known methods for welding together metals may be used as the welding method. Examples include TIG welding, spot welding, laser welding and ultrasonic welding. Joining together the electrodes and the metal tab by ultrasonic welding is preferred.

Ultrasonic welding methods are exemplified by a technique in which a plurality of electrode plates are placed between an anvil and a horn, the metal tab is placed at the welding region, and welding is carried out collectively by the application of ultrasonic energy; and a technique in which the electrode plates are first welded together, following which the metal tab is welded.

In this invention, with either of these methods, not only are the metal tab and the electrodes welded together at the welding region, the plurality of electrode plates are ultrasonically welded to one another. The pressure, frequency, output power, treatment time, etc. during welding are not particularly limited, and may be suitably set while taking into account, for example, the material used.

A laminate cell can be obtained by placing the electrode assembly produced as described above within a laminate pack, injecting the electrolyte solution described above, and subsequently heat sealing.

EXAMPLES

Synthesis Examples, Examples and Comparative Examples are given below to more fully illustrate the invention, although the invention is not limited by these Examples.

The measuring instruments used in the Synthesis Examples were as follows.

[GPC]
  Instrument: EcoSEC HLC-8320 GPC (Tosoh Corporation)
  Columns: TSK-GEL Super AW3000+AW4000 (Tosoh Corporation)
  Column temperature: 40° C.
  Solvent: 10 mM LiBr/DMAc
  Detector: UV (271 nm)
  Working curve: standard polystyrene
[FT-IR]
  Instrument: IR Prestige 21 (Shimadzu Corporation)

[Example 1] Synthesis of P-Boc-mPDA

[Chem. 5]

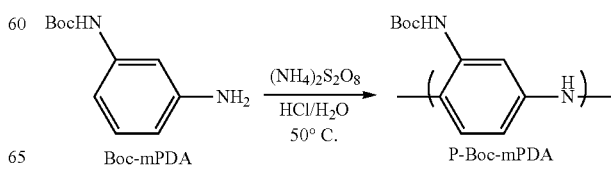

The following were mixed in a flask: 4.17 g (20 mmol) of N-tert-butoxycarbonyl)-1,3-phenylenediamine (Tokyo Chemical Industry Co., Ltd.), 4 mL (20 mmol) of 5 mol/L hydrochloric acid (Kanto Chemical Co., Inc.) and pure water (96 mL). The temperature was raised to 50° C., after which a solution of 4.56 g (20 mmol) of ammonium persulfate (Junsei Chemical Co., Ltd.) dissolved in 100 mL of pure water was added dropwise. Following addition, the mixture was stirred at 50° C. for 4 hours. The system was cooled to room temperature, following which the polymer that settled out was filtered off, washed with pure water and vacuum dried, giving 1.57 g of P-Boc-mPDA (yield, 39%) as a brown solid. The results of GPC measurement indicated that the Mw was 12,800 and Mw/Mn was 6.6.

[Comparative Example 1] Synthesis of P-mPDA

[Chem. 6]

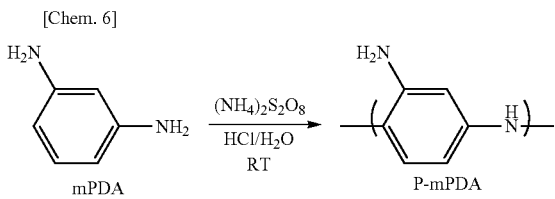

The following were mixed in a flask: 216 mg (2.0 mmol) of 1,3-phenylenediamine (Tokyo Chemical Industry Co., Ltd.), 0.4 mL (2.0 mmol) of 5 mol/L hydrochloric acid (Kanto Chemical Co., Inc.) and pure water (9.6 mL). At room temperature, a solution of 456 mg (2.0 mmol) of ammonium persulfate (Junsei Chemical Co., Ltd.) dissolved in 10 mL of pure water was added dropwise. Following addition, the mixture was stirred at room temperature for 4 hours. The polymer that settled out was filtered off, washed with pure water and vacuum dried, giving 80.9 mg of P-mPDA (yield, 37%) as a brown solid.

[IR Measurement]

FIG. 1 shows the results of infrared absorption spectral measurements for the resulting P-Boc-mPDA and P-mPDA, and for the P-Boc-mPDA precursor N-(tert-butoxycarbonyl)-1,3-phenylenediamine. The spectrum for P-mPDA showed no absorption near 1700 cm$^{-1}$ attributable to the tert-butoxycarbonyl group. On the other hand, in the spectrum for P-Boc-mPDA, as with the spectrum for the monomer N-(tert-butoxycarbonyl)-1,3-phenylenediamine, absorption near 1700 cm$^{-1}$ attributable to the tert-butoxycarbonyl group was clearly confirmed.

Example 2

A nonaqueous electrolyte solution was prepared by adding 2 wt % of vinylene carbonate to a solution obtained by dissolving 1 mol/L of LiPF$_6$ in a mixed carbonate solvent (ethylene carbonate:ethyl methyl carbonate=1:3 (volumetric ratio)), and also adding as an additive 0.72 wt % of the P-Boc-mPDA synthesized in Example 1.

A paste-like positive electrode mixture slurry was prepared by mixing together 100 parts by weight of a positive electrode active material (Li(Ni$_{0.85}$Co$_{0.10}$Al$_{0.05}$)O$_2$), 2 parts by weight of a conductive agent (acetylene black, a Denka Black powder from Denka Co., Ltd.), 50 parts by weight of a conductive material (graphite powder, J-SP, from Nippon Graphite Industries Co., Ltd.), 50 parts by weight of a binder (PVDF, #7208 (8 wt % NMP solution), from Kureha Corporation) and 15.4 parts by weight of NMP (Mitsubishi Chemical Corporation). Next, the positive electrode mixture slurry was uniformly coated onto both sides of a positive electrode current collector (aluminum foil; thickness, 20 μm; from UACF Foil Corporation) using a coating device, dried, and lastly compressed using a roll press, thereby producing a positive electrode having a mixture coating weight per side of 16.4 mg/cm$^2$ and a mixture thickness per side of 55 μm.

A paste-like negative electrode mixture slurry was prepared by mixing together 100 parts by weight of a negative electrode active material (graphite, MAG-E, from Hitachi Chemical Co., Ltd.), 1.1 parts by weight of a thickening agent (CMC, product number 2200, from Daicel FineChem Ltd.), 3.1 parts by weight of a binder (SBR, TRD2001 (48.5 wt % aqueous dispersion), from JSR Corporation) and 131 parts by weight of pure water. Next, the negative electrode mixture slurry was uniformly coated onto both sides of a negative electrode current collector (copper foil; thickness, 16.5 μm; from UACF Foil Corporation) using a coating device, dried and lastly compressed using a roll press, thereby producing a negative electrode having a mixture coating weight per side of 12.5 mg/cm$^2$ and a mixture thickness per side of 96 μm.

Leads were formed by welding an aluminum positive electrode tab to an exposed region of the positive electrode aluminum foil and welding a nickel negative electrode tab to an exposed region of the negative electrode copper foil, after which the electrodes were stacked while placing a separator (thickness, 25 μm; from Asahi Kasei Corporation) in between and were then spirally wound, producing a wound electrode assembly. The wound electrode assembly was then flattened and shaped under pressure to form a flat wound electrode assembly. The flat wound electrode assembly was placed within an enclosure made of aluminum laminate film (EL408PH, from Dai Nippon Printing Co., Ltd.), and the nonaqueous electrolyte solution was injected therein to 130 vol % with respect to the void volume of the positive and negative electrodes and the separator, after which sealing was carried out, thereby fabricating a flat lithium=ion secondary battery B1. This battery had a capacity of 912 mAh at a working voltage of 3 to 4.2 V.

Comparative Example 2

Aside from not using P-Boc-mPDA, a flat lithium-ion secondary battery B2 was fabricated by the same method as in Example 1.

Comparative Example 3

Aside from using N-(tert-butoxycarbonyl)-1,3-phenylenediamine instead of P-Boc-mPDA as the additive, a flat lithium-ion secondary battery B3 was fabricated by the same method as in Example 1.

[Discharge Rate Test]

Charging and discharging of the flat lithium-ion secondary batteries B1 to B3 was carried out under the following conditions, and the discharge capacities at various discharge rates were measured. The test results are shown in Table 1.

Temperature: 25° C.

Voltage: 3.0 to 4.2 V

Charge current: ⅓ C (where 1 C=900 mA)

Discharge current: ⅓ C, ½ C, 1 C, 2 C, 3 C, 5 C

TABLE 1

| | | Discharge rate | | | | | |
|---|---|---|---|---|---|---|---|
| | | 1/3 C | 1/2 C | 1 C | 2 C | 3 C | 5 C |
| Discharge capacity (mAh) | Example 2 | 954 | 935 | 899 | 850 | 779 | 405 |
| | Comparative Example 2 | 941 | 922 | 886 | 836 | 756 | 363 |
| | Comparative Example 3 | 915 | 893 | 844 | 764 | 630 | 224 |

As shown in Table 1, compared with the battery in Comparative Example 1 which uses a nonaqueous electrolyte that does not contain an additive, a battery which contains N-(tert-butoxycarbonyl)-1,3-phenylenediamine as an additive had lower discharge capacities particularly at high discharge rates. Compared with this, the battery in Example 2 which contains as an additive the P-Boc-mPDA synthesized in Example 1 had discharge capacities which, particularly at high discharge rates, remain at the same level or rise relative to Comparative Example 2.

[Short-Circuit Test]

Fabricated batteries B1 to B3 were prepared as short-circuit test specimens by carrying out constant-current, constant-voltage charging from 300 mA (a rate corresponding to 1/3 C) to 30 mA (a rate corresponding to 1/30 C). A thermocouple for monitoring the battery temperature was installed in a center portion of the short-circuit test specimens. While monitoring the battery voltage, a 10 mm-diameter zirconia ball was lowered down from above at a velocity of 0.1 mm/s onto the center portion of the short-circuit test specimen on the opposite side from the surface on which the thermocouple was installed, thereby pressing down on the center portion of the battery. A short circuit was considered to have occurred when the battery voltage fell to 1/3 or less of the voltage prior to the start of the test, at which point descent of the zirconia ball was stopped. In this test, the battery was regarded as unsafe when the battery temperature rose to 400° C. or more and smoking of the battery occurred. The battery was regarded as safe when the battery temperature stopped rising at 110° C. or below and smoking from the battery was not observed. Table 2 shows the test results obtained from three test runs on each of the short-circuit test specimens.

TABLE 2

| | Additive | Proportion of batteries that were unsafe | Maximum battery temperature (° C.) |
|---|---|---|---|
| Example 2 | Polymer A1 | 2/3 | 105 |
| Comparative Example 2 | None | 3/3 | 512 |
| Comparative Example 3 | N-(tert-butoxycarbonyl)-1,3-phenylenediamine | 3/3 | 108 |

As shown in Table 1, in the Comparative Example 2 battery in which a nonaqueous electrolyte solution containing no additive was used, the battery temperature after shorting rose to 512° C. and vigorous smoking occurred in all three of the test runs. Likewise, in the Comparative Example 3 battery in which a nonaqueous electrolyte solution containing N-(tert-butoxycarbonyl)-1,3-phenylenediamine as the additive was used, the battery temperature after shorting rose to 512° C. and vigorous smoking occurred in all three of the test runs. By contrast, in the Example 2 battery in which a nonaqueous electrolyte solution containing P-Boc-mPDA as the additive was used, at a small amount of addition of only 0.72 wt %, the rise in battery temperature after shorting was held down to below 110° C. and smoking was not observed in one of the three test runs. Hence, the advantageous effect of improved safety at the time of a short-circuit was obtained.

The invention claimed is:

1. A polymer comprising repeating units of formula (1) below

[Chem. 1]

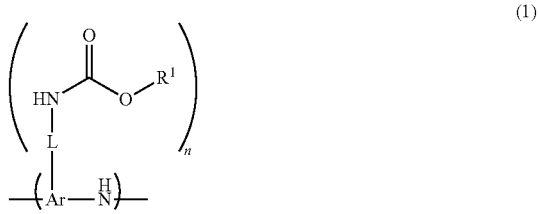

(wherein n is an integer of 1 or more;

R$^1$ is a monovalent aliphatic hydrocarbon group of 1 to 60 carbon atoms that may be substituted with Z$^1$, a monovalent aromatic hydrocarbon group of 6 to 60 carbon atoms that may be substituted with Z$^2$ or a monovalent heterocycle-containing group of 2 to 60 carbon atoms that may be substituted with Z$^2$;

L is a single bond, a divalent aliphatic hydrocarbon group of 1 to 60 carbon atoms that may be substituted with Z$^1$, a divalent aromatic hydrocarbon group of 6 to 60 carbon atoms that may be substituted with Z$^2$ or a divalent heterocycle-containing group of 2 to 60 carbon atoms that may be substituted with Z$^2$;

Ar is a (2+n)-valent aromatic hydrocarbon group of 6 to 60 carbon atoms that may be substituted with Z$^2$ or a (2+n)-valent heterocycle-containing group of 2 to 60 carbon atoms that may be substituted with Z$^2$;

Z$^1$ is a halogen atom, an amino group, a hydroxyl group, a nitro group, a cyano group, an oxo group, a carboxyl group, a sulfo group, a phosphate group, a thiol group, a silyl group, a monovalent aromatic hydrocarbon group of 6 to 60 carbon atoms that may be substituted with Z$^3$ or a monovalent heterocycle-containing group of 2 to 60 carbon atoms that may be substituted with Z$^3$;

Z$^2$ is a halogen atom, an amino group, a hydroxyl group, a nitro group, a cyano group, an oxo group, a carboxyl group, a sulfo group, a phosphate group, a thiol group, a silyl group or a monovalent aliphatic hydrocarbon group of 1 to 60 carbon atoms that may be substituted with Z$^3$; and Z$^3$ is a halogen atom, an amino group, a hydroxyl group, a nitro group, a cyano group, an oxo group, a carboxyl group, a sulfo group, a phosphate group, a silyl group or a thiol group).

2. The polymer of claim 1, wherein Ar is a group obtained by removing n hydrogen atoms from the aromatic ring of a phenylene group that may be substituted with Z$^2$.

3. The polymer of claim 1, wherein L is a single bond.

4. The polymer of claim 1, wherein R$^1$ is a group such that R$^1$—O—C(O)— serves as an amino protecting group.

5. An additive for nonaqueous electrolyte solutions, comprising the polymer of claim 1.

6. A nonaqueous electrolyte solution comprising the additive of claim 5.

7. The nonaqueous solution of claim 6, wherein the content of the additive is from 0.01 to 10 wt %.

8. The nonaqueous solution of claim 7, wherein the content of the additive is from 0.1 to 1 wt %.

9. A lithium-ion secondary battery comprising the nonaqueous electrolyte solution of claim 6, and a positive electrode and negative electrode capable of intercalating and deintercalating lithium.

10. The lithium-ion secondary battery of claim 9 which is adapted for use by charging in a range of 4.0 to 5.0 V.

11. The lithium-ion secondary battery of claim 9, wherein the positive electrode comprises a positive electrode active material which is a layered lithium composite oxide.

12. The lithium-ion secondary battery of claim 11, wherein the layered lithium composite oxide is a compound of formula (6) below $$Li(Ni_a Co_n Mn_c)O_2 \qquad (6)$$

(wherein a, b and c being numbers that satisfy the conditions 0≤a≤1, 0≤b≤1, 0≤c≤1 and a+b+c=1).

13. The lithium-ion secondary battery of claim 11, wherein the layered lithium composite oxide is a compound of formula (7) below $$Li(Ni_d Co_e Al_f)O_2 \qquad (7)$$

(wherein d, e and f being numbers that satisfy the conditions 0≤d<1, 0≤e<1, 0<f<1 and d+e+f=1).

* * * * *